March 18, 1941.  E. B. ANDERSON  2,235,002
UNIVERSAL JOINT
Filed Dec. 4, 1937  3 Sheets-Sheet 2
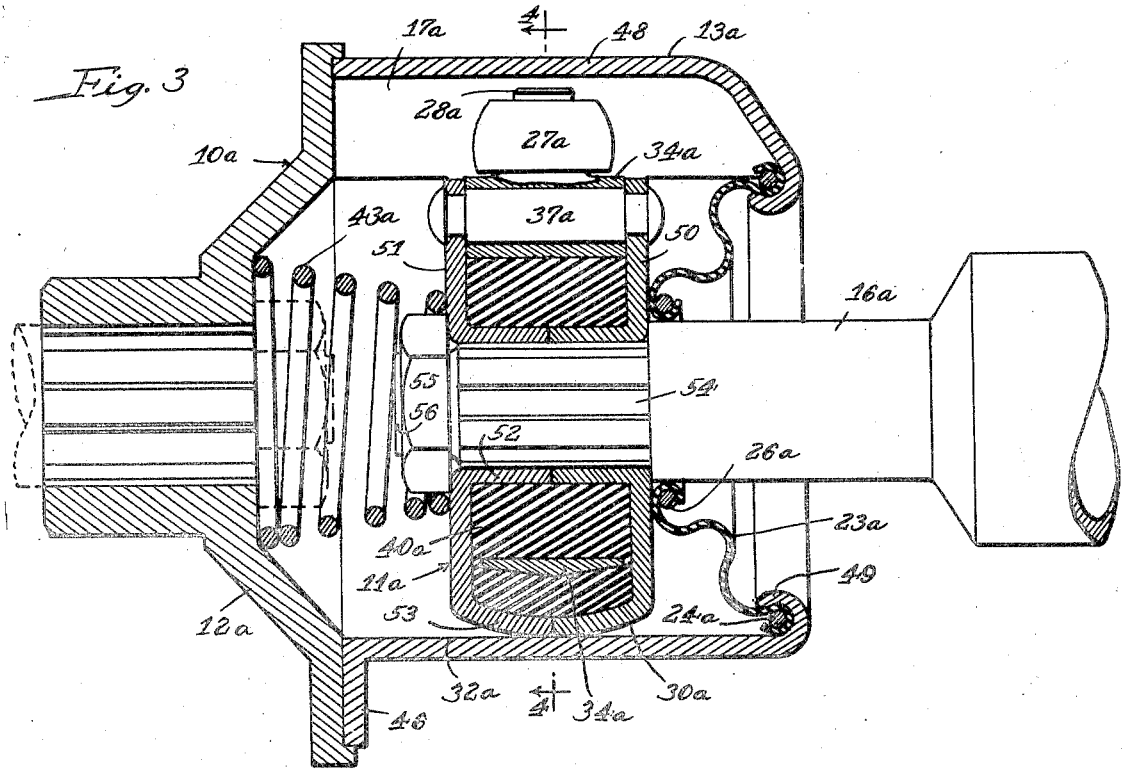
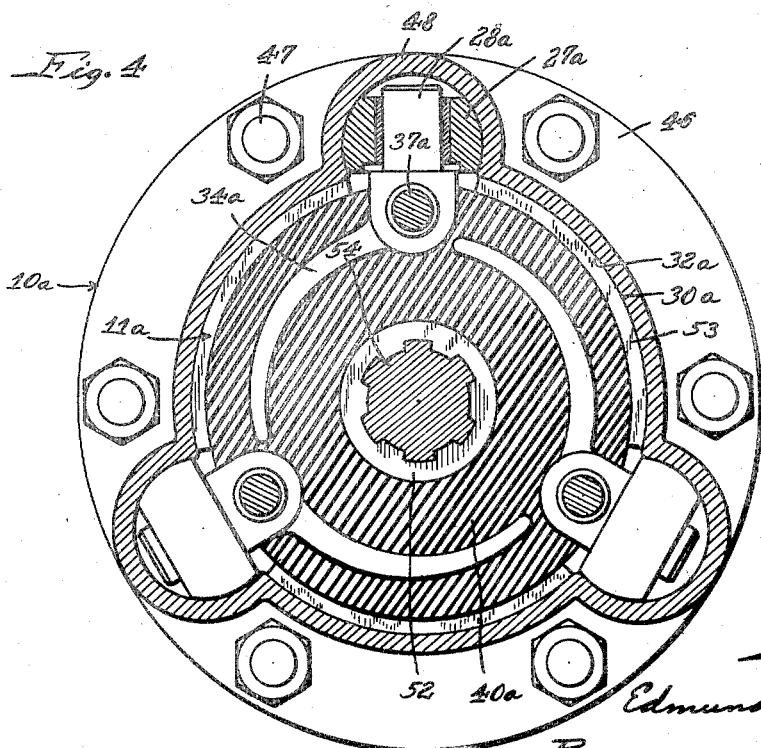
Inventor
Edmund B. Anderson
By
McCanna, Wintercorn & Morsbach
Attys.

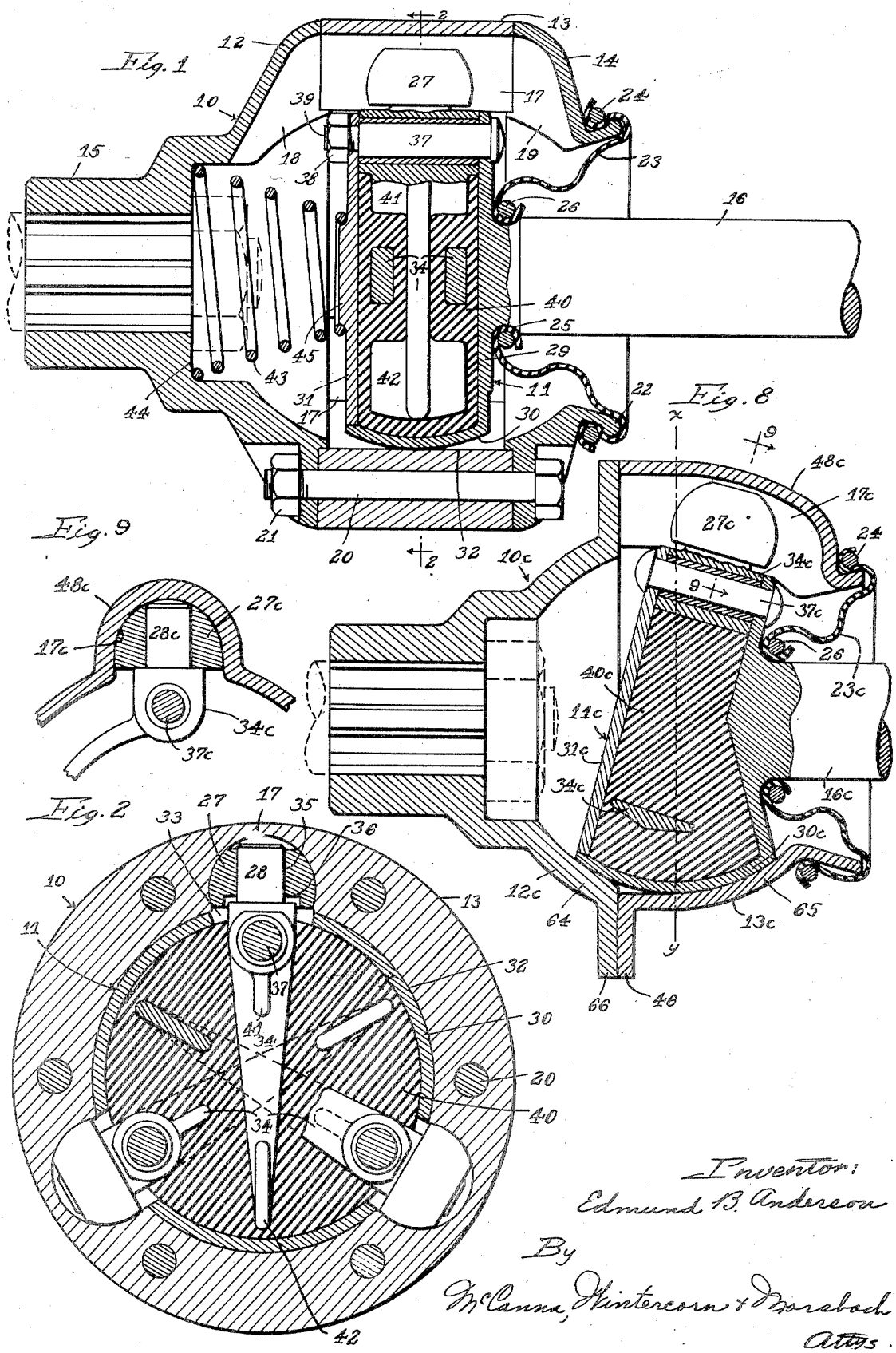

Inventor:
Edmund B. Anderson
By McCanna, Wintercorn & Morsbach
Attys.

Patented Mar. 18, 1941

2,235,002

UNITED STATES PATENT OFFICE 2,235,002

UNIVERSAL JOINT

Edmund B. Anderson, Rockford, Ill., assignor, by direct and mesne assignments, to Borg-Warner Corporation, Chicago, Ill., a corporation of Illinois Application December 4, 1937, Serial No. 178,123

22 Claims. (Cl. 64—7)

This invention relates to universal joints, and more particularly those used on propeller shafts on motor vehicles.

I am aware of the state of development of the art in so far as trunnion type universal joints are concerned, and am likewise familiar with the Weiss type universal joints (Patent 1,522,351) using balls interposed between the relatively movable members in ball races or grooves to secure smooth and easy operation. It is well known that serious manufacturing difficulties were presented with the Weiss type joints; their prohibitive cost is the chief reason they have not been used extensively by automobile manufacturers. It is therefore the principal object of my invention to provide an intermediate type universal joint involving the use of spheroidal bearing members rotatably mounted on trunnions provided on one yoke and rolling in ball races or grooves provided in the companion yoke, this design permitting production of these joints in quantities at very little, if any, increase in cost over the ordinary trunnion type joints, while still obtaining the advantages inherent in the Weiss type joints, namely, constant velocity operation and smooth, easy performance.

Another important object of my invention is to provide a cushioned universal joint constructed along the lines just stated in which the trunnions are pivotally mounted for oscillation in the plane of rotation of the supporting yoke and have resilient means yieldingly resisting such movement, whereby to cushion the drive and also dampen out vibrations otherwise transmitted through the universal joints and ultimately reaching the body of the car. While cushioned couplings and universal joints have been proposed before, they have invariably incorporated the rubber or other cushioning means so that the load was placed directly thereon, thereby stressing the cushioning medium to such an extent that it would not give long service and making it necessary to go to larger and impractical diameters of assemblies in order to relieve the cushioning medium of destructive stresses. A salient feature of the present construction is the manner in which only a portion of the load is imposed on the cushioning medium, like rubber or synthetic rubber, the direct load being taken upon the trunnions and their pivots and a portion being then transmitted from the trunnions to the cushioning medium through lever arms projecting from the bases of the trunnions, so as to avoid destructive distortion and working of this material while keeping the assembly down to a small diameter.

Another object is to provide a joint of the character described in which the ball races can be conveniently formed in stamped sheet metal parts for lightness and cheapness, one of the designs herein shown having the ball race part specially designed to permit provision of arcuate races so that the spheroidal bearing members may operate therein without endwise movement relative to the trunnions.

Still another object is to provide a universal joint of the kind mentioned in which the ball races are elongated so that the joint incorporates slip action in its own assembly and there is no necessity for an extra slip spline member otherwise provided to compensate for the relative movement of the rear axle housing with relation to the transmission housing.

The invention is illustrated in the accompanying drawings, in which—

Figure 1 is a central longitudinal section through a universal joint made in accordance with my invention;

Fig. 2 is a cross-section on the line 2—2 of Fig. 1;

Figs. 3 and 4 are similar views of a modified or alternative construction, Fig. 4 being taken on the line 4—4 of Fig. 3;

Figs. 5 and 6 are similar views of a further modification in which Fig. 6 is taken on the line 6—6 of Fig. 5;

Fig. 8 is a section similar to Fig. 1, showing a still further modification, and Fig. 9 is a sectional detail on the line 9—9 of Fig. 8.

Similar reference numerals are applied to corresponding parts throughout the views.

Figure 5:
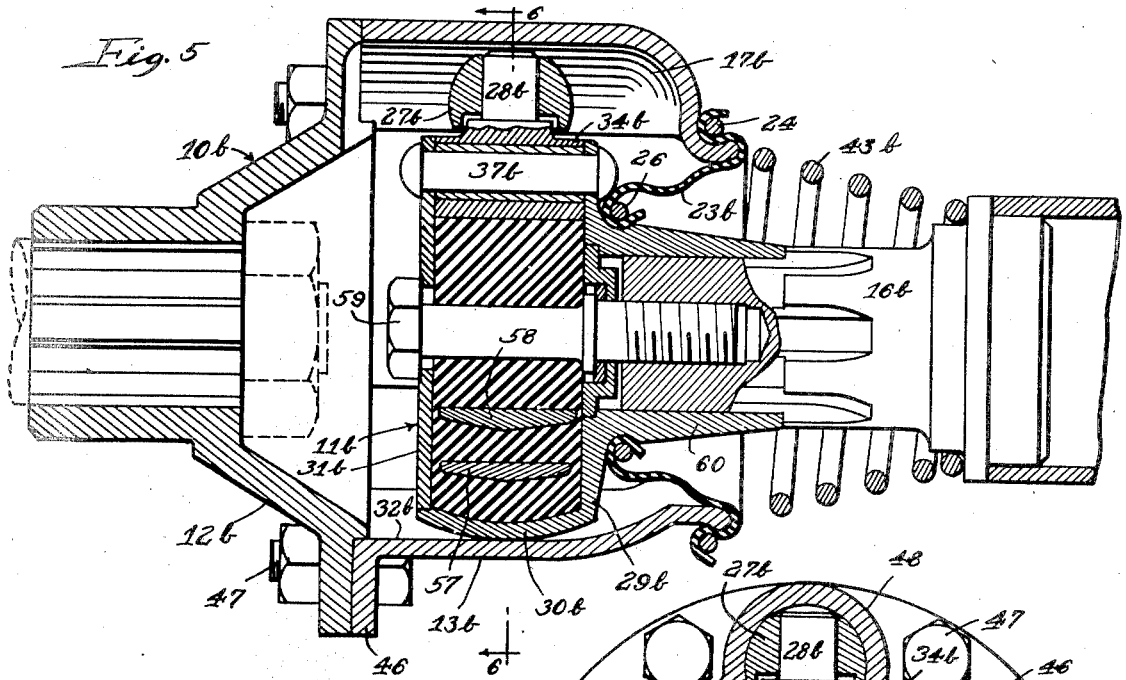

Referring first to Figs. 1 and 2, the numeral 10 designates one yoke of the universal joint and 11 is the other yoke. The yoke 10 is formed in three parts 12—14, the part 12 having an internally splined hub 15 to make a good driving connection with the driven shaft projecting from the transmission housing, assuming the joint shown is the front one of two on a propeller shaft. 16 may be the propeller shaft itself or a stub shaft end for a tubular propeller shaft (see Figs. 3 and 5). The middle part 13 of the yoke 10 has three or more longitudinal, substantially semicylindrical ball races or grooves 17 machined therein in uniformly circumferentially spaced relation, three such races being shown in Fig. 2. Communicating with the ends of these races are radial channels or grooves 18 and 19 in the end parts 12 and 14, respectively, whereby to allow free flow of lubricant to and from the races 17. The end part 14 of the yoke 10 receives bolts 20 in holes therein registering with holes in the middle race part 13 and end part 12, whereby the bolts when entered through these parts, as shown in Fig. 1, serve to secure the same together when nuts 21 applied to the projecting ends thereof are tightened. The end part 14 has a rim 22 on which a flexible boot 23 for retaining lubricant in the yoke 10 is adapted to be secured by means of a ring 24, as shown. The boot is of frustoconical form, its large end being lapped over the outside of the rim 22 and its small end protruding into the yoke 10 and being folded back and fastened in place in an annular groove 25 in the shaft 16 next to the yoke 11 by means of another ring 26. In that way, any lubricant coming in contact with the boot 23 will be thrown outwardly therefrom inside the yoke 10 toward the races 17 for good lubrication of the races and the spheroidal bearing members or rollers 27 operating therein and carried on trunnions 28 on the yoke 11.

The yoke 11 is of hollow construction and double truncated spheroidal form, the same having a flat back wall 29 normal to the axis of the shaft 16 and integral therewith and a spheroidal peripheral wall 30 in concentric relation with the shaft 16 and integral with the wall 29, while a plate 31 forms the front wall parallel with the back wall 29. The yoke 11 has a free universal working fit in the circular bore 32 of the middle race part 13 of the yoke 10, the peripheral wall 30 engaging in the bore 32, as clearly appears in Fig. 1, to permit oscillation of the yoke 11 or sliding movement back and forth relative to the yoke 10. At three points in equally circumferentially spaced relation, the peripheral wall 30 is cut away, as at 33, in alignment with the races 17, and radial arms 34 project from the yoke 11 through these openings into the races 17. These arms carry the trunnions 28 which are cylindrical and have an easy working fit in axial holes 35 in the rollers 27. The holes 35 are counterbored, as at 36, so as to provide a certain amount of clearance permitting endwise movement of the trunnions relative to the rollers. The rollers, due to the fact that the races 17 are slightly more than half round, as clearly appears in Fig. 2, are held against inward displacement from the races and in the assembling of the joint are entered in the races from one end. Bolts 37 provide pivotal support for the arms 34, and these are passed through holes in the back wall 29 and through registering holes in the arms 34 and in the front plate 31, and nuts 38 are threaded on the reduced ends 39 of the bolts to fasten the plate 31 in place. The arms 34 are thereby mounted for oscillation in the plane of rotation of the yoke 11. Such oscillation, however, is restrained in accordance with my invention by any suitable yieldable and/or resilient means whereby to provide a smooth cushioned drive by absorption of shocks in the yielding cushioning means, and also dampen out vibrations that would otherwise be transmitted through the joint and ultimately reach the body of the car. For example, many vibrations originating usually at the rear end of the transmission train can be absorbed in this way and the car will perform much more quietly and smoothly as a result. While springs of any suitable type might be used, I prefer to employ rubber, and more particularly a specially suitable synthetic oil-resistant rubber that is now available commercially. The yoke 11 is shown in Figs. 1 and 2 as filled with molded synthetic rubber 40 in which the arms 34, previously mentioned, are embedded. These arms in order to clear one another are in three planes and substantially uniformly spaced with respect to one another and to the walls 29 and 31, whereby to permit filling in between and all around these arms with a sufficient thickness of molded rubber to eliminate likelihood of cutting of the rubber by shearing action. Each arm has laterally projecting fins 41 and 42 at its pivoted and free ends, respectively, for better purchase and bearing contact on the surrounding rubber. The assembly for yoke 11 will be made up with the exception of the plate 31 at the time the rubber 40 is molded therein. Then the plate 31 will be applied. The tapered coiled spring 43 bearing on the seat 44 in the yoke 10 at one end and fitting around the circular boss 45 on the plate 31 at its other end serves to resist endwise movement of the yoke 11 in one direction, so as to tend to keep the yoke 11 operating centrally in the yoke 10 in substantially the position shown in Fig. 1.

In operation, the present joint transmits drive from the yoke 10 to the yoke 11, or vice versa, with substantially constant velocity, assuming the driving torque is likewise so applied. In view of this fact, it follows that when one of these joints is to be one of a pair at opposite ends of a propeller shaft, the companion joint should be of the same construction, or at least of another constant velocity type. The rollers 27 in the rotation of the yokes and incidental angular movement of one yoke relative to the other roll back and forth in the races 17 and the trunnions 28 oscillate on the pivots 37 and slide back and forth in the bores 35 of the rollers as necessitated by the angularity of the yokes. This roller action obviously makes for smooth and easy operation, and it should be clear that if the races 17 are provided of sufficient length, the universal joint assembly will provide within itself an anti-friction slip action obviating the necessity for an extra slip spline member. The cushioning action afforded by the rubber 40 not only provides smoother drive by cushioning the shocks transmitted from the rollers 27 to the trunnions 28 and thence to the arms 34, causing the arms to oscillate about their pivots 37, but also serves to dampen out vibrations otherwise transmitted through universal joints. While rubber has been used in cushioned couplings and rubberized universal joints of one kind and another, the designs employed invariably imposed a too direct load upon the rubber, stressing and distorting the rubber to such an extent and otherwise working it so that it would sooner or later break down. Furthermore, it was necessary to make the assembly too large in diameter whenever the design had in view the prevention of over-stressing the rubber. In the present construction, firstly, because of the fact that the direct load is taken by the trunnions 28 and their pivots 37 and only a portion of the load is transmitted to the rubber cushioning medium from the trunnions through the levers 34 which oscillate therewith; secondly, because of the leverage amplification afforded by the arms 34 and the consequent degrees in pressure on the rubber, and thirdly, because of the fact that three or more of these arms share in the transmission of the driving force to the rubber, there is sufficient distribution of the torque load so that there is no danger of breaking down the rubber, and the joint can therefore be kept down to a small diameter in relation to a specified torque. The fact that in the present construction the rubber cushions the three or more trunnions on the one yoke member, makes for better distribution of the load on the rubber than would be possible in the cushioning of an ordinary spider type universal joint, because in that type two of the trunnions must necessarily be provided on one yoke and the other two on the other yoke, and if either pair or both pairs of trunnions are cushioned, the load distribution to the rubber is necessarily limited to two trunnions. Hence, the torque capacity of that type is too limited for practical purposes, so far as provision for cushioning action is concerned. The lateral yieldability of the trunnions 28, coupled with the fact that there is an odd number of trunnions in evenly circumferentially spaced relation accounts for the constant velocity operation. For example, four trunnions evenly circumferentially spaced would not give constant velocity operation, whereas three do. By way of explanation: referring to Fig. 2, it will be evident that if the yoke 11 is tilted in the plane of the vertical trunnion the roller 27 on that trunnion will simply run back and forth in the associated groove or race 17 and the trunnion will ride in and out in the bore 35 of the roller, but the two other trunnions are compelled to yield laterally in opposite directions with respect to their pivots 37 as the yoke 11 is tilted in either direction with respect to the yoke 10. Manifestly, this condition is repeated time and again in the rotation of the yokes when disposed in acute angle relationship to one another, and it is the lateral yieldability of the trunnions permitted by the yielding resilient medium 40 coupled with the fact that there are three trunnions which accounts for the constant velocity operation. In passing, it may also be observed that the yieldable trunnions 28 will obviously compensate for any slight irregularities in the spacing of the races 17, and thus obviate serious binding action, the irregularity being taken up in the rubber cushioning medium and resulting merely in less play being apparent in the joint, which is, of course, advantageous.

The joint shown in Figs. 3 and 4 has a yoke 10a composed of two pieces 12a and 13a, the latter being a sheet metal stamping formed to provide races 17a for the rollers 27a on the yoke 11a and also formed to provide an annular outwardly projecting flange 46 at one end for bolting the part 13a to the part 12a, at at 47. The races 17a, it will be seen from Fig. 4, are formed in hollow outwardly projecting longitudinal bosses 48. An inturned annular flange 49 formed on the other end of the part 13a provides an annular recess therein wherein one end of a tapered flexible boot 23a is adapted to be fastened, as by means of a ring 24a, the other end of the boot being held by another ring 26a on the shaft 16a next to the yoke 11a. This boot will therefore operate in substantially the same manner as the boot 23 previously described. Now, the yoke 11a is formed by two stamped sheet metal rings 50 and 51 having inner and outer annular flanges 52 and 53 in concentric relation, and the inner and outer flanges of the two rings are held in edge to edge abutment by rivets 37a which constitute the pivots for the arms 34a that carry the trunnions 28a for the rollers 27a. The outer flanges 53 are of spheroidal form, and these flanges when disposed in abutment provide the spheroidal peripheral wall 30a of the yoke 11a engaging the cylindrical bore 32a with a free universal working fit permitting not only angular movement of the yokes 10a and 11a with respect to one another, but also relative sliding movement therebetween. The arms 34a in this joint are of arcuate form and all extend in the same direction from the pivots 37a around the axis of rotation, all of these arms being concentric with the axis of rotation as a common center. Synthetic oil-resistant rubber 40a is molded around these arms, filling the annular space between the flanges 52 and 53. The yoke 11a is internally splined to fit on the splined end 54 of the shaft 16a and is secured in place by a nut 55 threaded on the reduced threaded end 56 of the shaft. A spring 43a acting between the two yokes 10a and 11a acts to resist sliding movement of the yoke 11a in one direction and tends to keep the yoke operating substantially centrally in the yoke 12a, in which position it is shown in Fig. 3.

The operation of this joint is substantially the same as with the joint previously described, and substantially the same advantages are derived. The only difference is that in this case the races 17a are somewhat elongated over what is shown in Figs. 1 and 2, and this is to allow for greater amplitude of slip action in the universal joint assembly to avoid the necessity of providing an extra slip spline member.

Figure 6:
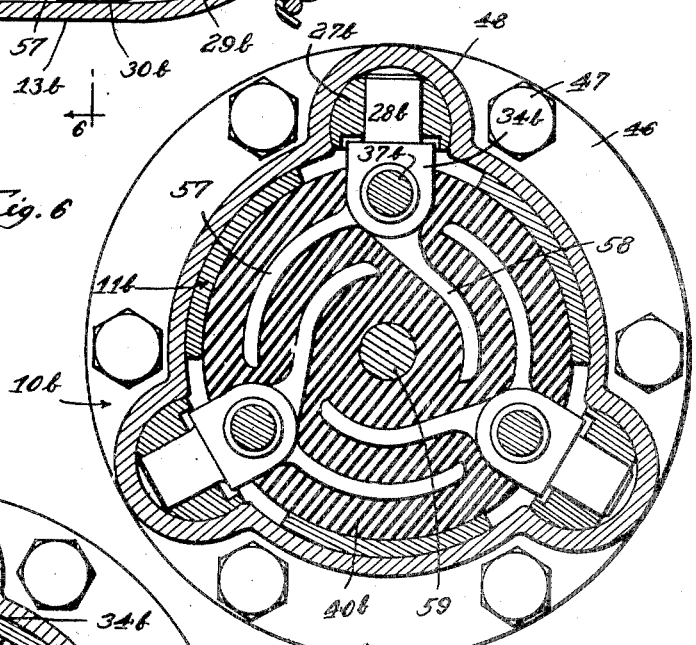

The joint shown in Figs. 5 and 6 is quite similar to that of Figs. 3 and 4, because the yoke 10b is also composed of two parts 12b and 13b bolted together, as at 46—47. The part 13b is a sheet metal stamping formed with hollow longitudinal bosses 48 providing races 17b therein for the rollers 27b carried on the yoke 11b. The boot 23b is similar to the boot 23 first described, and is fastened in place in a similar manner by rings 24 and 26. The trunnions 28b in this joint are carried on arms 34b pivoted on rivets 37b, the arms being forked so that each provides an outer arcuate branch 57 and an inner arcuate branch 58, the branches being concentric about the axis of rotation as a center. The molded synthetic oil-resistant rubber 40b in which these arms are imbedded fills the hollow yoke 11b and a bolt 59 serves to fasten the yoke onto the end of the shaft 16b, a good driving connection being secured by having an internally splined neck 60 on the yoke fitting the splined portion of the shaft 16b, as shown. The spring 43b in this case is outside the joint acting between a shoulder on the shaft 16b and the adjacent end of the yoke 10b to resist relative sliding movement between the yokes and tend to keep the yoke 11b in the substantially central position illustrated. The operation of this joint is substantially the same as the other, and substantially the same advantages are derived.

Figure 7:
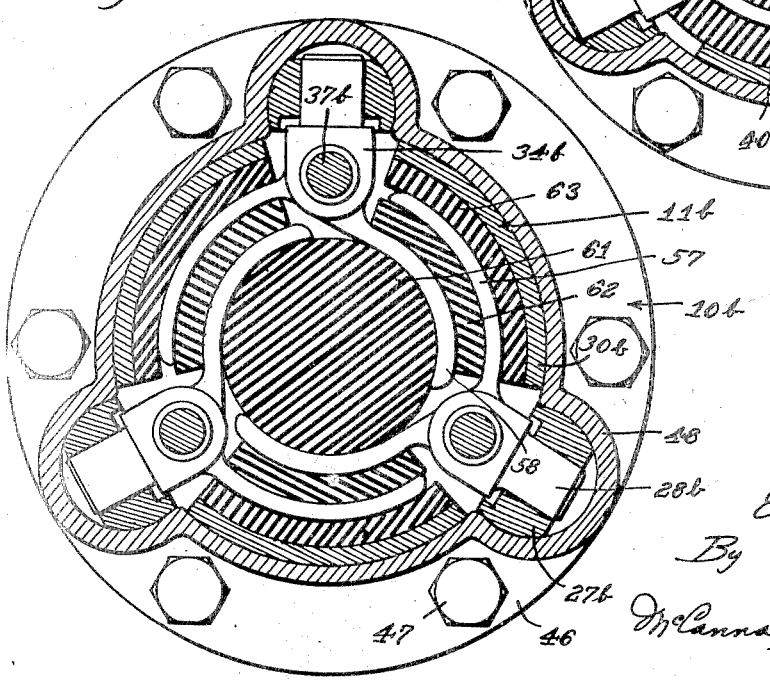
Fig. 7 is a section similar to Fig. 6, illustrating the use of rubber strips and a cylindrical rubber center block in place of the molded material.

Fig. 7 corresponds to Fig. 6, excepting for a showing of a separate substantially cylindrical center block 61 of synthetic oil-resistant rubber engaging the inner sides of the branches 58 of the arms 34b, while separate strips 62 of synthetic oil-resistant rubber are interposed between the branches 58 and 57, and still other strips 63 of synthetic oil-resistant rubber are interposed between the branches 57 and the peripheral wall 30b of the yoke 11b. It is, of course, apparent that with this construction substantially the same operation and the same advantages are derived as with the construction of Figs. 5 and 6.

In all of the joints described thus far, the races for the rollers are straight, and this necessitates making provision for a certain amount of endwise movement of the rollers with respect to the trunnions. In the joint shown in Figs. 8 and 9, races 17c are arcuate in form and, of course, concentric about a common center on the axis of rotation of the yokes 10c and 11c. With this construction, the rollers 27c will turn on the trunnions 28c, but there is no need for providing for relative endwise movement beyond a normal operating clearance. The yoke 10c is formed from two parts 12c and 13c, the latter being a substantially semi-spheroidal sheet metal stamping. Now, in order that the part 13c may be stamped, it is apparent that the races 17c must be formed in hollow bosses 48c in the hemisphere to the right of the plane x—y, which is a plane passing through the center from which the arcs for these races are struck; otherwise, the punch that will fit in the three or more finished races 17c could not be withdrawn from the die. That fact gives rise to the necessity for the set-back of all of the trunnions 28c at acute angles to the plane x—y, like that shown in Fig. 8; otherwise the rollers 27c would not have sufficient latitude of movement back and forth in the races required for a specified amplitude of angularity between the yokes. The races 17c being formed between dies can obviously be only semi-circular in form, as clearly appears in Fig. 9, but inasmuch as there is no appreciable endwise movement of the trunnions 28c in the rollers 27c, the rollers cannot leave the races. The peripheral wall 30c of the yoke 11c is of spheroidal form to work with a free universal movement inside the spheroidal shaped portions 64 and 65 of the parts 12c and 13c. The parts 12c and 13c are adapted to be secured together by bolts entered through the companion flanges 46 and 66 similarly as illustrated in Figs. 3 to 7.

The trunnions 28c are carried on arms 34c pivoted on rivets 37c. These arms are similar to the arms 34a shown in Figs. 3 and 4 and are imbedded in molded synthetic oil-resistant rubber 40c with which the yoke 11c is filled, for a similar purpose. The oil-retaining boot 23c is similar to that shown in Fig. 1, and is held in place in a similar manner by rings 24 and 26. Generally speaking, this joint will operate in a similar manner as those previously described and will afford similar advantages. With this joint, however, since there is no provision for sliding movement of one yoke relative to the other, it follows that the customary extra slip spline member will be necessary.

It is believed the foregoing description conveys a good understanding of the objects and advantages of my invention. The appended claims have been drawn with a view to covering all legitimate modifications and adaptations.

I claim:

1. In a universal joint, the combination of inner and outer yoke members adapted to have relative angular displacement while rotating together, one of said yokes having a plurality of longitudinal grooves provided therein in equally circumferentially spaced relation and the other of said yokes having a like number of trunnions mounted thereon in radial planes in corresponding circumferentially spaced relation and having oscillatable bearing engagement in said grooves, all of said trunnions being oscillatable laterally relative to and in the plane of rotation of the yoke supporting the same, and resilient means yieldably restraining such oscillatory movement.

2. In a universal joint, the combination of inner and outer yoke members adapted to have relative angular displacement while rotating together, one of said yokes having a plurality of longitudinal grooves provided therein in equally circumferentially spaced relation and the other of said yokes having a like number of trunnions mounted thereon in radial planes in corresponding circumferentially spaced relation and projecting into said grooves, all of said trunnions being laterally oscillatable in either direction in the plane of rotation of the yoke supporting the same, and spherical rollers rotatable on said trunnions and slidable oscillatable and rotatable in said grooves.

3. In a universal joint, the combination of inner and outer yoke members adapted to have relative angular displacement while rotating together, one of said yokes having a plurality of longitudinal grooves provided therein in equally circumferentially spaced relation and the other of said yokes having a like number of trunnions mounted thereon in radial planes in corresponding circumferentially spaced relation and projecting into said grooves, all of said trunnions being laterally oscillatable in either direction relative to and in the plane of rotation of the yoke supporting the same, spherical rollers rotatable on said trunnions and slidable, oscillatable and rotatable in said grooves, and resilient means yieldably restraining lateral oscillatory movement of said trunnions.

4. In a substantially constant velocity universal joint, the combination of inner and outer yoke members adapted to have relative angular displacement while rotating together, one of said yokes having an odd number of longitudinal grooves provided therein in equally circumferentially spaced relation and the other of said yokes having a like number of cushioning trunnions mounted thereon in radial planes in corresponding circumferentially spaced relation and having oscillatable bearing engagement in said grooves, transverse pivots on said yoke supporting said trunnions to tilt in either direction transversely relative to said grooves, and resilient means resisting tilting movement of said trunnions from normal substantially radial positions.

5. In a substantially constant velocity universal joint, the combination of inner and outer yoke members adapted to have relative angular displacement while rotating together, one of said yokes having an odd number of longitudinal grooves provided therein in equally circumferentially spaced relation and the other of said yokes having a like number of cushioning trunnions mounted thereon in radial planes in corresponding circumferentially spaced relation and projecting into said grooves, rollers rotatable on said trunnions and slidable and rotatable in said grooves, transverse pivots on said yoke supporting said trunnions to tilt in either direction transversely relative to said grooves, said grooves being slightly more than semi-circular in cross-section and said rollers being of spheroidal form so as to be free to oscillate in the grooves in the tilting of the trunnions while held against radial displacement therefrom, said trunnions being slidable endwise in said rollers, and resilient means resisting tilting movement of said trunnions from normal substantially radial positions.

6. In a universal joint, the combination of inner and outer yoke members adapted to have relative angular displacement while rotating together, one of said yokes having a plurality of longitudinal grooves provided therein in equally circumferentially spaced relation and the other of said yokes having trunnions provided thereon in radial planes in corresponding circumferentially spaced relation and projecting into said grooves, said grooves being provided in a section of the outer yoke member which is of substantially hemispherical form, the grooves being arcuate and struck from a common center on the axis of rotation of the inner yoke member and all of said trunnions having their axes on lines passing through said center and all at the same acute angle to a plane normal to the axis of rotation of said inner yoke member and on the same side of said plane as said hemispherical yoke section.

7. In a universal joint, the combination of inner and outer yoke members adapted to have relative angular displacement while rotating together, one of said yokes having a plurality of longitudinal grooves provided therein in equally circumferentially spaced relation and the other of said yokes having trunnions provided thereon in radial planes in corresponding circumferentially spaced relation and projecting into said grooves, said grooves being provided in a section of the outer yoke member which is of substantially hemispherical form, the grooves being arcuate and struck from a common center on the axis of rotation of the inner yoke member and all of said trunnions having their axes on lines passing through said center and all at the same acute angle to a plane normal to the axis of rotation of said inner yoke member and on the same side of said plane as said hemispherical yoke section and rollers on said trunnions working in said grooves, the grooves being substantially semi-circular in cross-section and the rollers operating therein being of spheroidal form and fitting rotatably with close working fits in said grooves.

8. In a universal joint, the combination of inner and outer yoke members adapted to have relative angular displacement while rotating together, the outer yoke having a substantially cylindrical bore and having, radially outwardly relative to the bore, a plurality of longitudinal grooves provided therein in equally circumferentially spaced relation, the inner yoke being of spheroidal form and working with a swivel fit in said bore, a plurality of trunnions in radial planes on said inner yoke having oscillatable bearing engagement in said grooves, all of said trunnions being oscillatable laterally relative to and in the plane of rotation of said inner yoke, and resilient means yieldably restraining such oscillatory movement.

9. In a universal joint, the combination of inner and outer yoke members adapted to have relative angular displacement while rotating together, the outer yoke having a substantially cylindrical bore and having, radially outwardly relative to the bore, a plurality of longitudinal grooves provided therein in equally circumferentially spaced relation, the inner yoke being of spheroidal form and working with a swivel fit in said bore, a plurality of trunnions in radial planes on said inner yoke extending into said grooves, all of said trunnions being laterally oscillatable in either direction in the plane of rotation of the yoke supporting the same, and spheroidal rollers rotatably mounted on said trunnions and working in said grooves.

10. In a universal joint, the combination of inner and outer yoke members adapted to have relative angular displacement while rotating together, the outer yoke having a substantially cylindrical bore and having, radially outwardly relative to the bore, a plurality of longitudinal grooves provided therein in equally circumferentially spaced relation, the inner yoke being of spheroidal form and working with a swivel fit in said bore, a plurality of trunnions in radial planes on said inner yoke extending into said grooves, transverse pivots on said yoke supporting said trunnions to tilt in either direction transversely relative to said grooves, and rollers rotatably mounted on said trunnions and working in said grooves, said grooves being more than semi-circular in cross-section and said rollers being of spheroidal form and fitting closely in said grooves so as to be held against radial displacement therefrom, the trunnions being slidable endwise in said rollers.

11. In a universal joint, the combination of inner and outer yoke members adapted to have relative angular displacement while rotating together, one of said yokes having a plurality of trunnion bearings thereon in equally circumferentially spaced relation and the other of said yokes having trunnions mounted thereon in radial planes in corresponding circumferentially spaced relation and projecting into said bearings, and means whereby said trunnions are pivotally mounted for lateral oscillation on and resiliently yieldable under torsional stress relative to their associated yoke member in the plane of rotation thereof.

12. In a universal joint, the combination of inner and outer yoke members adapted to have relative angular displacement while rotating together, one of said yokes having a plurality of trunnion bearings thereon in equally circumferentially spaced relation and the other of said yokes having trunnions mounted thereon in radial planes in corresponding circumferentially spaced relation and having oscillatable bearing engagement in said bearings, transverse pivots on said yoke supporting said trunnions to tilt in either direction transversely relative to said bearings, lever arms extending from said trunnions for oscillation therewith in the plane of rotation of their associated yoke member, and resilient means engaging said lever arms at points spaced from their axes of oscillation for yieldingly restraining oscillatory movement thereof.

13. In a universal joint, the combination of inner and outer yoke members adapted to have relative angular displacement while rotating together, one of said yokes having a plurality of trunnion bearings thereon in equally circumferentially spaced relation and the other of said yokes having trunnions mounted thereon in radial planes in corresponding circumferentially spaced relation and having oscillatable bearing engagement in said bearings, transverse pivots on said yoke supporting said trunnions to tilt in either direction transversely relative to said bearings, lever arms extending from said trunnions for oscillation therewith in the plane of rotation of their associated yoke member, and rubber cushioning means compressible by said lever arms in the oscillatory movement thereof.

14. In a universal joint, the combination of inner and outer yoke members adapted to have relative angular displacement while rotating together, one of said yokes having a plurality of trunnion bearings thereon in equally circumferentially spaced relation and the other of said yokes having trunnions mounted thereon in radial planes in corresponding circumferentially spaced relation and having oscillatable bearing engagement in said bearings, transverse pivots on said yoke supporting said trunnions to tilt in either direction transversely relative to said bearings, lever arms extending from said trunnions for oscillation therewith in the plane of rotation of their associated yoke member, and rubber cushioning means compressible by said lever arms in the oscillatory movement thereof, said lever arms having enlarged flat bearing surfaces provided thereon for distribution of pressure over a correspondingly larger area on the rubber cushioning means disposed in substantially full engagement with said surfaces.

15. In a universal joint, the combination of inner and outer yoke members adapted to have relative angular displacement while rotating together, one of said yokes having a plurality of trunnion bearings thereon in equally circumferentially spaced relation and the other of said yokes having trunnions mounted thereon in radial planes in corresponding circumferentially spaced relation and having oscillatable bearing engagement in said bearings, transverse pivots on said yoke supporting said trunnions to tilt in either direction transversely relative to said bearings, a plurality of lever arms extending from each of said trunnions for oscillation therewith in the plane of rotation of their associated yoke member, and rubber cushioning means compressible by all of said lever arms in their oscillation.

16. In a universal joint, the combination of inner and outer yoke members adapted to have relative angular displacement while rotating together, the outer yoke having a substantially cylindrical bore and having, radially outwardly relative to the bore, a plurality of trunnion bearings thereon in equally circumferentially spaced relation, the inner yoke being of spheroidal form and working with a swivel fit in said bore, a plurality of trunnions in radial planes on said inner yoke having oscillatable bearing engagement in said bearings, transverse pivots on said inner yoke supporting said trunnions to tilt in either direction on the inner yoke transversely relative to said bearings, said inner yoke member being hollow and said trunnions having ends extending into the space in said inner yoke member, and the latter being filled with rubber to resiliently cushion the oscillatory movement of said trunnions and rollers.

17. In a universal joint, the combination of inner and outer yoke members adapted to have relative angular displacement while rotating together, the outer yoke having a substantially cylindrical bore and having, radially outwardly relative to the bore, a plurality of trunnion bearings thereon in equally circumferentially spaced relation, the inner yoke being of spheroidal form and working with a swivel fit in said bore, a plurality of trunnions in radial planes on said inner yoke having oscillatable bearing engagement in said bearings, transverse pivots on said inner yoke supporting said trunnions to tilt in either direction on the inner yoke transversely relative to said bearings, said inner yoke member being hollow and said trunnions having arcuate lever arms on the inner ends thereof extending into the space inside said inner yoke member, the arms being in spaced relation to one another and in substantially concentric relation about the axis of rotation of said yoke as a center, and said yoke being filled with rubber to resiliently cushion the oscillatory movement of said trunnions and rollers.

18. In a substantially constant velocity universal joint, the combination of inner and outer yoke members adapted to have relative angular displacement while rotating together, one of said yokes having three longitudinal grooves provided therein in equally circumferentially spaced relation and the other of said yokes having three cushioning trunnions mounted thereon in radial planes in corresponding circumferentially spaced relation and having oscillatable bearing engagement in said grooves, transverse pivots on said yoke supporting said trunnions to tilt in either direction transversely relative to said grooves, and resilient means resisting tilting movement of said trunnions from normal substantially radial positions.

19. In a substantially constant velocity universal joint, the combination of inner and outer yoke members adapted to have relative angular displacement while rotating together, one of said yokes having three longitudinal grooves provided therein in equally circumferentially spaced relation and the other of said yokes having three cushioning trunnions mounted thereon in radial planes in corresponding circumferentially spaced relation and projecting into said grooves, rollers rotatable on said trunnions and slidable and rotatable in said grooves, transverse pivots on said yoke supporting said trunnions to tilt in either direction transversely relative to said grooves, said grooves being slightly more than semi-circular in cross-section and said rollers being of spheroidal form so as to be free to oscillate in the grooves in the tilting of the trunnions while held against radial displacement therefrom, said trunnions being slidable endwise in said rollers, and resilient means resisting tilting movement of said trunnions from normal substantially radial positions.

20. In a universal joint, the combination of inner and outer yoke members adapted to have relative angular displacement while rotating together, the outer yoke having a plurality of internal longitudinal grooves provided therein in equally circumferentially spaced relation in a section of said yoke which is of substantially hemispherical form, said grooves being arcuate and struck from a common center on the axis of rotation of the inner yoke member, and the inner yoke member having trunnions provided thereon in radial planes in corresponding circumferentially spaced relation and having spheroidal bearing engagement in said grooves, all of said trunnions having their axes on lines passing through said common center and all at the same acute angle to a plane normal to the axis of rotation of said inner yoke on the same side of said plane as said hemispherical yoke section, all of said trunnions being yieldable laterally in the plane of rotation of the inner yoke, and resilient means yieldingly restraining such lateral movement.

21. In a universal joint, the combination of inner and outer yoke members adapted to have relative angular displacement while rotating together, the outer yoke having a plurality of internal longitudinal grooves provided therein in equally circumferentially spaced relation in a section of said yoke which is of substantially hemispherical form, said grooves being arcuate and struck from a common center on the axis of rotation of the inner yoke member, and the inner yoke member having trunnions provided thereon in radial planes in corresponding circumferentially spaced relation and having spheroidal bearing engagement in said grooves, all of said trunnions having their axes on lines passing through said common center and all at the same acute angle to a plane normal to the axis of rotation of said inner yoke on the same side of said plane as said hemispherical yoke section, pivots on said inner yoke in transverse relation to the aforesaid plane permitting lateral oscillation of the trunnions in the plane of rotation of the inner yoke, said inner yoke being hollow, lever arms extending from said trunnions inside the inner yoke, and a fill of rubber in said inner yoke surrounding said lever arms and yieldingly restraining lateral movement thereof.

22. In a universal joint, the combination of inner and outer yoke members adapted to have relative angular displacement while rotating together, the outer yoke having a substantially cylindrical bore and having, radially outwardly relative to the bore, a plurality of longitudinal grooves provided therein in equally circumferentially spaced relation, the inner yoke being of spheroidal form and working with a swivel fit in said bore, a plurality of trunnions in radial planes on said inner yoke extending into said grooves, all of said trunnions being laterally oscillatable in either direction in the plane of rotation of the yoke supporting the same, spheroidal rollers rotatably mounted on said trunnions and working in said grooves, and resilient means yieldably restraining lateral oscillation of said trunnions.

EDMUND B. ANDERSON.